United States Patent [19]

Lang

[11] Patent Number: 4,693,397

[45] Date of Patent: Sep. 15, 1987

[54] DOSING DEVICES FOR VISCOUS MATERIALS PARTICULARLY HIGHLY VISCOUS MATERIALS

[75] Inventor: Hans-Jörg Lang, Biberbach, Fed. Rep. of Germany

[73] Assignee: Ludwig Schwerdtel GmbH, Fed. Rep. of Germany

[21] Appl. No.: 634,281

[22] Filed: Jul. 25, 1984

[30] Foreign Application Priority Data

Jul. 29, 1983 [DE] Fed. Rep. of Germany ....... 3327420

[51] Int. Cl.$^4$ ............................................. B67D 5/52
[52] U.S. Cl. .................................... 222/137; 222/145; 222/288; 222/327
[58] Field of Search .............. 222/129, 132, 135, 136, 222/137, 288, 309, 333, 334, 380, 388, 427, 145, 252, 282, 325–327, 504, 544, 548; 137/625.21, 625.46

[56] References Cited

U.S. PATENT DOCUMENTS

| | | | |
|---|---|---|---|
| 3,696,710 | 10/1972 | Ortelli | 137/625.21 X |
| 3,963,148 | 6/1976 | Proni et al. | 222/132 |
| 4,030,637 | 6/1977 | Boden et al. | 222/137 |
| 4,119,126 | 10/1978 | Nabiullin et al. | 141/100 |
| 4,228,924 | 10/1980 | Gilbert | 222/63 |
| 4,273,261 | 6/1981 | Krueger | 222/135 |
| 4,286,732 | 9/1981 | James et al. | 222/46 |
| 4,402,428 | 9/1983 | Lang et al. | 222/58 |
| 4,411,601 | 10/1983 | Hersom et al. | 417/388 |

Primary Examiner—Joseph J. Rolla
Assistant Examiner—Michael S. Huppert
Attorney, Agent, or Firm—Laff, Whitesel, Conte & Saret

[57] ABSTRACT

A dosing device for dosing viscous materials has a dosing cylinder for a main material and at least one dosing cylinder for an additive and a common drive for the dosing pistons of said dosing cylinders. In order to permit the simple dosing of the main material and the at least one additive in a time-constant volume ratio, and in order to permit changes to the volume ratio to be made in a simple manner, while permitting the dosing of highly viscous main materials and additives, the dosing cylinders are arranged parallel to one another and their dosing pistons are arranged to be driven with an identical stroke. The dosing piston of the at least one additive dosing cylinder is constructed as a plunger with a smaller cross-section than the cross-section of the associated dosing cylinder. In addition, the plunger is sealingly guided in an interchangeable guide bush of the dosing cylinder. Moveover, the at least one additive dosing cylinder is interchangeably connected as a subassembly to a support frame.

4 Claims, 3 Drawing Figures

DOSING DEVICES FOR VISCOUS MATERIALS PARTICULARLY HIGHLY VISCOUS MATERIALS

FIELD OF THE INVENTION

This invention relates to a dosing device for dosing viscous materials, particularly highly viscous materials, including a dosing cylinder for a main material and at least one dosing cylinder for an additive to be dosed in an in each case fixed but variable volume ratio with respect to the main material.

BACKGROUND OF THE INVENTION

Generally, highly viscous materials, such as silicone rubber as a base for sealing compounds with additives, e.g. pigments dosed in appropriate quantities, are mixed in large mixers and are subsequently filled into cartridges in filling installations. A considerable amount of mixing work is involved. Changes in the nature and/or quantity of the added additives, particularly when they are pigments, also lead to a considerable amount of cleaning effort and expenditure.

U.S. Pat. No. 4,402,428 discloses a dosing device for highly viscous materials, which admittedly leads to a precise dosing of such materials, but does not permit the bringing together of several substances in in each case constant quantity ratios.

SUMMARY OF THE INVENTION

The object of the present invention is to provide a dosing device, by means of which a main material and at least one additive are dosed in a time-constant volume ratio, whilst permitting modifications to the latter in a simple manner.

Accordingly, the present invention provides a dosing device for dosing viscous materials, particularly highly viscous materials, including a dosing cylinder for a main material and at least one dosing cylinder for an additive to be dosed in an in each case fixed but variable volume ratio with respect to the main material, each dosing cylinder containing a dosing piston drivable by a common drive, said drive and said dosing pistons being arranged on a common frame, a respective supply connection issuing into each dosing cylinder and a respective outlet connection issuing therefrom, each of said connections being openable or closable by means of a respective two-way valve, said dosing cylinders being arranged substantially parallel to one another, the dosing pistons of said dosing cylinders being drivable with an identical stroke and the dosing piston of the at least one additive dosing cylinder being constructed as a plunger with a smaller cross-section than the cross-section of the dosing cylinder for said main material and the plunger being sealingly guided in an interchangeable guide bush of said additive dosing cylinder.

The arrangement of the dosing cylinder and the completely identical stroke ensure that identical volumes are always mixed together over the single stroke, independently of the stroke rate and the constancy of the stroke movement. This makes it possible to mix the main material and the additive or additives in a quasi-continuously operating mixer and to supply the same to a cartridge filling installation. The sum of the main material and the additive or additives of one stroke or an integral multiple of one stroke are filled into one cartridge. It is easily possible to modify the volume ratios, because this merely requires the replacement of the plunger and the guide bush receiving the latter.

Preferably, the at least one additive dosing cylinder is connected in an interchangeable manner as a subassembly to said common frame. This makes it possible to change the type of additive, e.g. a pigment, in a very simple manner. It is obvious that this arrangement can be used for merely bringing about changes to the volume ratios. In this case, the complete standard component is changed and then, on the latter, the plunger with the guide bush are interchanged. The at least one additive dosing cylinder is preferably connected to the frame by means of a rapidly connectable and releasable coupling in order to facilitate replacement.

According to a preferred embodiment of the invention, the dosing piston of the cylinder for said main material and the plunger of said at least one additive dosing cylinder engage with a cross-beam which is displaceable by said common drive parallel to itself along the axes of said dosing piston and plunger. This ensures an absolutely parallel drive of the dosing pistons. However, if the pressure feeding of the main material and the additive or additives into the dosing cylinder is carried out in the manner which is appropriate or even necessary in the case of highly viscous materials, the plunger of the said at least one additive dosing cylinder is not connected to the cross-beam which makes it possible to simplify further the interchangeability of the plunger on the at least one dosing cylinder for the additive.

Each two-way valve may be constructed as a cone plug which is sealed against the inner wall of the associated dosing cylinder on the side of said supply connection and outlet connection remote from the dosing piston. This provides a simple development of at least one dosing cylinder, which is to be interchangeable in the form of a closed unit and which requires minimum effort for cleaning purposes. The areas to be cleaned are reduced as a result of the way in which the packing is arranged.

Each cone plug is desirably supported on a respective sliding disk which ensures that the cone plug is easily operable, despite one-sided pressure loading.

The cone plug of the at least one additive dosing cylinder is desirably connected by means of a detachable coupling to a rotary drive. This arrangement facilitates easy replacement of the at least one additive dosing cylinder.

The dosing device according to the invention is preferably used for a dosed bringing together of transparent silicone rubber as the main material and at least one pigment as the additive. The same main material, namely transparent silicone rubber is then always used in a plant and it is merely necessary to change the pigments, which only involves limited and very simple technical reconstructions. However, the dosing device can obviously also be used for other main materials and additives if comparable problems occur, such as e.g. in the foodstuffs field.

BRIEF DESCRIPTION OF THE DRAWINGS

The invention will now be described in greater detail, with reference to the drawings, in which.

DETAILED DESCRIPTION OF THE PREFERRED EMBODIMENT

Figure 1:
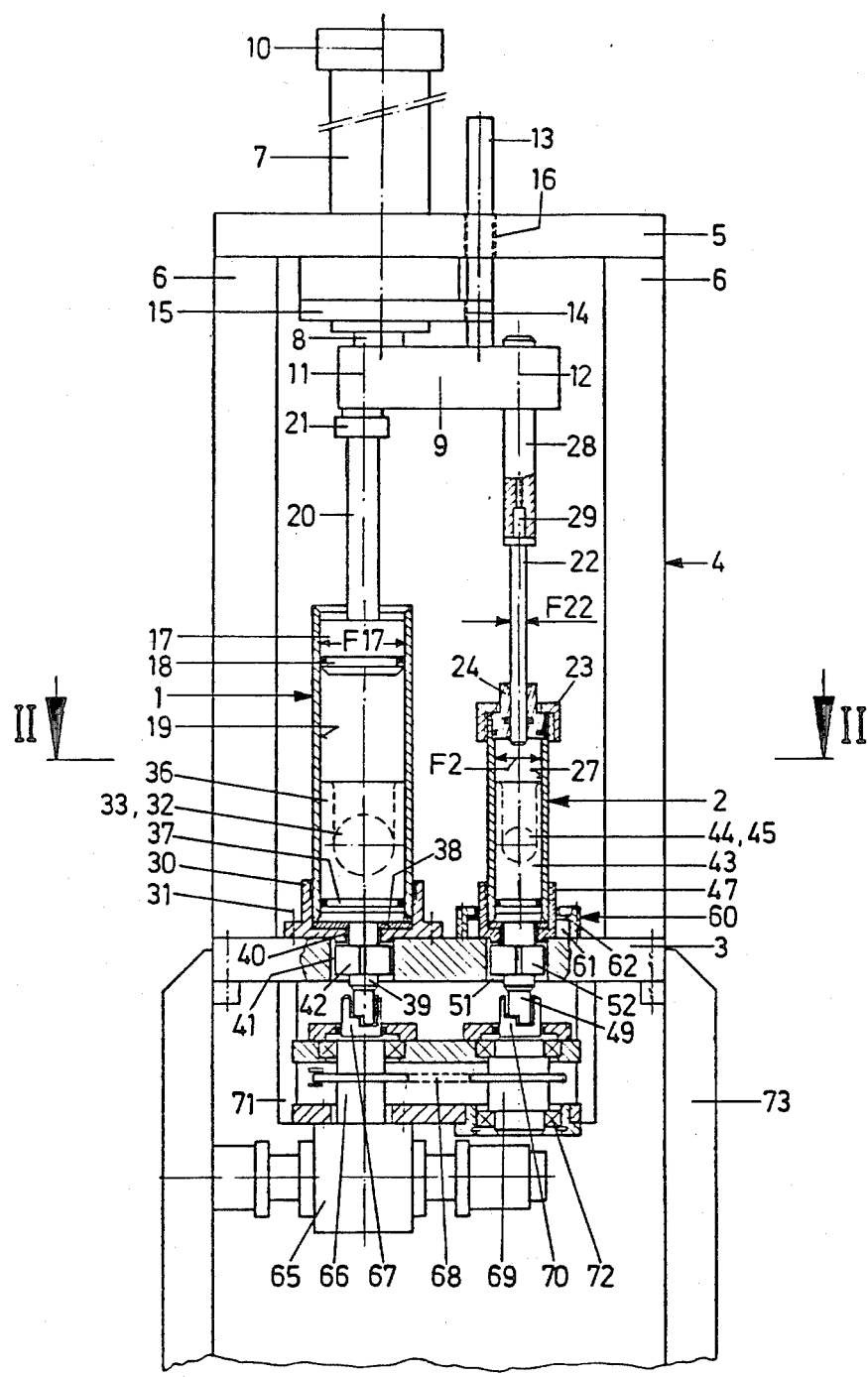
FIG. 1 is a part-sectioned front elevation of one embodiment of a dosing device according to the invention.
Figure 2:
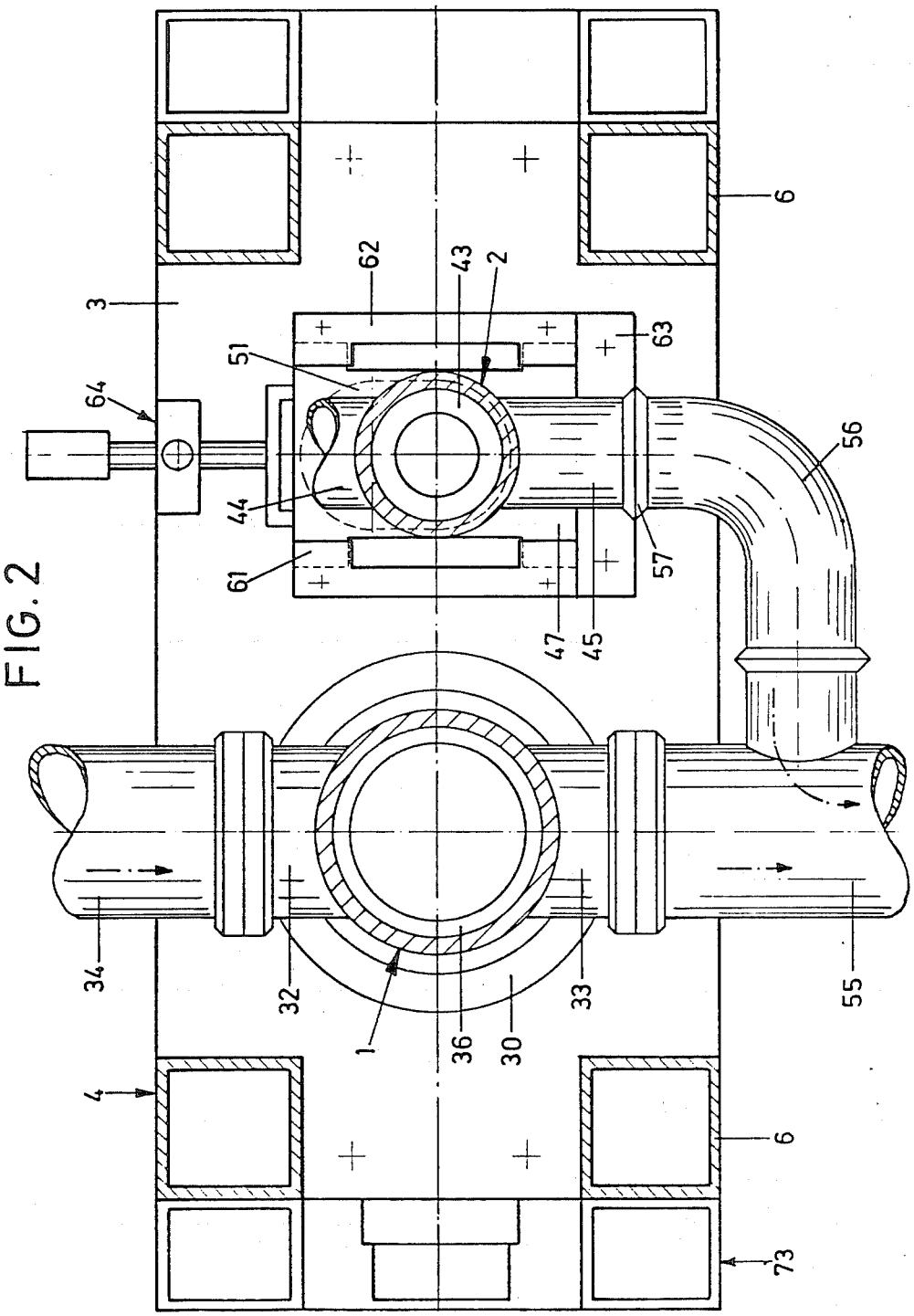
FIG. 2 is a section taken along line II—II of FIG. 1 on a larger scale.

The dosing device shown in the drawings has a dosing cylinder 1 for a main material, e.g. transparent silicone rubber, and a further dosing cylinder 2 for an additive, e.g. pigments. Obviously, the number of dosing cylinders and particularly the dosing cylinder for the additives can be increased at random. The dosing cylinders 1, 2 are placed on a base plate 3 of a frame 4. The frame 4 has an upper support plate 5 parallel to the base plate 3 and four parallel supports 6 in the corners of the rectangular plates 3, 5. The complete frame 4 is therefore parallelepipedic. The dosing cylinders 1, 2 extend parallel to the supports 6.

A hydraulic working cylinder 7, as a linear drive for the dosing cylinders 1, 2, is located on the upper support plate 5. A piston rod 8 of the hydraulic working cylinder 7 engages on a cross-beam 9 from which the dosing cylinders 1, 2 are driven. The distance between the axis 10 of the hydraulic working cylinder 7 and the axis 11 of the dosing cylinder 1 on the one hand and the axis 12 of the dosing cylinder 2 on the other hand roughly corresponds to the subsequently described reciprocal transmission ratio of the two dosing cylinders 1, 2 so that the cross-beam 9 is substantially free from torque during driving. In addition, the cross-beam 9 is vertically guided by means of a guide rod 13, which engages in a guide slot 14 in a guide flange 15 on the bottom of the hydraulic working cylinder 7. The guide rod 13 extends through a bore 16 in the support plate 5.

A dosing piston 17 is displaceably arranged on the axis 11 in the dosing cylinder 1 and is sealed against the inner wall 19 of the dosing cylinder 1 by means of a packing 18. A piston rod 20 is fitted to the dosing piston 17 and projects upwards to the cross-beam 9, whilst being coaxial to said axis 11. The piston rod 20 engages freely against a thrust bearing 21 on the cross-beam 9. Thus, the piston rod 20 and thrust bearing 21 are not interconnected, i.e. the dosing piston 17 is arranged in floating manner in the dosing cylinder 1.

In the case of the additive dosing cylinder 2, the dosing piston is constituted by a plunger 22, i.e. a so-called plunger piston. The diameter of the cylindrical rod-shaped plunger 22 is considerably smaller than the diameter of the dosing cylinder 2, as can be gathered from FIG. 1. The plunger 22 is guided coaxially to the axis 12 in a guide bush 24 fixed to the upper end of the dosing cylinder 2 by means of a cap nut 23. A packing 25 engaging with the plunger 22 is located in the guide bush 24. In the same way, the guide bush 24 is sealed by means of a packing 26 relative to the inner wall 27 of the dosing cylinder 2. The plunger 22 engages freely on a push rod 28 which is fitted to the cross-beam 9 and which extends coaxially to the axis 12 and which serves as a thrust bearing. A limit switch 29 is provided in the push rod 28 which makes it possible to establish whether or not the plunger 22 is engaging the push rod 28. A similar (not shown) switch is provided, in order to detect the engagement of the piston rod 20 of the dosing piston 17 on the thrust bearing 21.

The dosing cylinder 1 is screwed into a cup-shaped locking bush 30, which is fixed to the base plate 3 by means of screws, whereof only the axis 31 is shown in each case. A supply connection 32 for the main material to be dosed opens into the dosing cylinder 1 and, displaced 180° therefrom, there is an outlet connection 33 for the dosed main material. The supply connection 32 and outlet connection 33 are arranged in a common horizontal plane, which is at right angles to the supports 6. On the supply connection 32 is provided a supply line 34 through which the main material to be dosed is supplied under pressure to the dosing cylinder 1 so that the dosing piston 17 is raised. Thus, the dosing cylinder 1 is filled under pressure. Within the dosing cylinder 1 is provided a so-called cone plug 36, which is basically cylindrical and engages on the inner wall 19 of the dosing cylinder 1 and is cut out in such a way that, by a corresponding rotation of in each case 180°, it either opens or alternately closes the supply connection 32 serving as an inlet or the outlet connection 33 serving as an outlet. The precise construction will be described in connection with the dosing cylinder 2. The lower area of the cone plug 36 is sealed by means of a packing 37 against the inner wall 19 of the dosing cylinder 1. It is also supported on a frontally arranged sliding disk 38, supported on the cup-shaped locking bush 30 and made from a suitable plastics material, e.g. polytetrafluoroethylene.

The cone plug 36 is provided with a driver 39 running coaxially to the axis 11 and which passes through an opening 40 in the locking bush 30 and a corresponding bore 41 in the base plate 3 in a downwards direction out of the frame 4. Cone plug 36 is axially secured by means of a split locking ring 42, which engages with the bottom of the cup-shaped locking bush 30.

A supply connection 44 also opens into the dosing cylinder 2 and, displaced by 180° therefrom, an outlet connection 45 passes out of the same. Both of these are in one plane with the supply connection 32 and the outlet connection 33. Below the supply connection 44 and outlet connection 45, the cone plug 43 is sealed by a packing 46 against the inner wall 27 of the dosing cylinder 2. The dosing cylinder 2 is screwed into a cup-shaped locking bush 47, which is connected to the base plate 3 in a manner to be described hereinafter. The cone plug 43 is frontally supported on a sliding disk 48 which has an identical construction to the sliding disk 38. A driver 49 is placed coaxially to the axis 12 on the cone plug 43 and passes through an opening 50 in the locking bush 47 and a slot 51 in the base plate 3 in the downwards direction. Once again, the cone plug 43 is axially fixed by means of a split locking ring 52.

A supply line can be connected to the supply connection 44 and into the supply line is connected a pump, so that here again the additives to be dosed are supplied under pressure to the dosing cylinder 2, whilst the plunger 22 is moved out of the dosing cylinder 2 against the push rod 28.

A main discharge line 55 is connected to the outlet connection 33 of the dosing cylinder 1 and into it opens a discharge line 56, which is connected by means of a rapidly detachable pipe coupling 57 to the outlet connection 45 of the dosing cylinder 2. The main material and additive are brought together in a completely uniform manner and consequently only have to be mixed together along their path through the main discharge line 55, which can e.g. take place by means of corresponding components, which do not form part of the invention. The main discharge line can be directly followed by a cartridge filling machine and once again one dosing device stroke corresponds to a cartridge fill.

Figure 3:
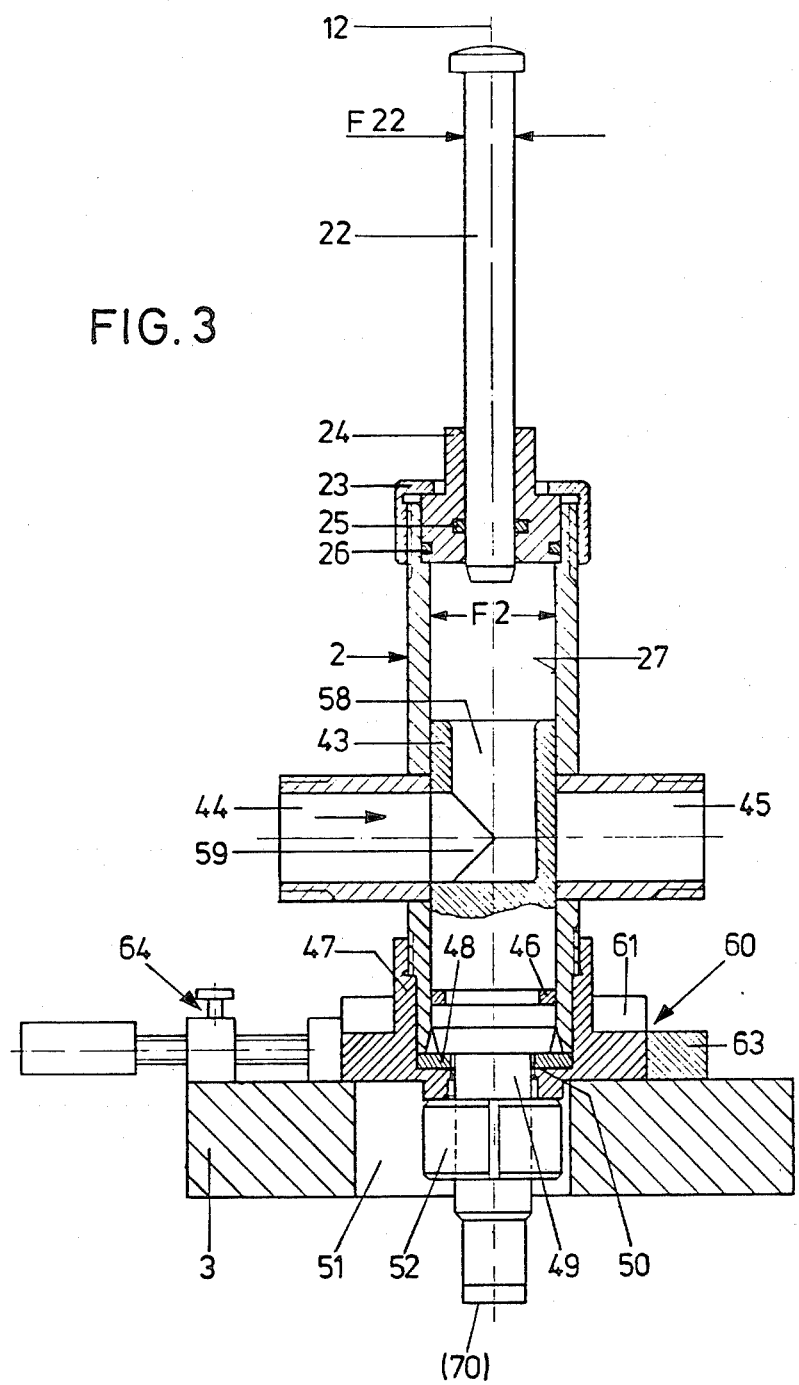
FIG. 3 is a vertical section through a dosing cylinder for an additive forming part of the device according to the invention but to a larger scale and turned through 90° with respect to FIG. 1.

As can be gathered from FIG. 3, the cone plug 43 comprises a solid cylindrical part, which at the top projects above the supply connection 44 and outlet connection 45, whilst being sealed all round and rotatably engages with the inner wall 27 of the dosing cylinder 2. Coaxial to the axis 12, a blind hole serving as an axial channel 58 is made from above in the cone plug 43 and runs roughly up to the lower boundary of the supply connection 44 or outlet connection 45.

From said axial channel 58 issues on one side a radial channel 59, which is also formed by a corresponding bore. As a function of whether the corresponding rotation of the cone plug 43 leads to the radial channel 59 being positioned in front of the supply connection 44 or the outlet connection 45, one of the said connections 44 or 45 is connected to the upper inner area of the dosing cylinder 2 into which is introduced the plunger 22. The diameter of the axial channel 58 is sufficiently large that the plunger 22 can also be introduced thereinto. The cone plug 36 of the dosing cylinder 1 is constructed in the same way, but the dosing piston 17 cannot be introduced into the axial channel of the cone plug 36, which is also not necessary, because the dosing cylinder 1 is longer than the dosing cylinder 2.

The dosing cylinder 2 is connected to the base plate 3 by means of a sliding connection 60, which permits a very rapid interchange of the dosing cylinder 2, together with the plunger 22. For this purpose, strip-like projections 61 are fitted to the locking bush 47, which projections are arranged parallel to one another on both sides and specifically parallel to the supply connection 44 and outlet connection 45. Angular retaining strips 62 are provided on the base plate 3 and overlap the projections 61. The slot 51 formed in the base plate 3 extends to the side of the supply connection 44. The fitting of the dosing cylinder 2 takes place in such a way that it is mounted on the base plate 3 in such a way that it is displaced from the axis 12 to the side of the supply connection 44, the driver 49 passing downwards through the slot 51 in the base plate 3. The dosing cylinder 2 is then moved into its position determined by the axis 12, the projections 61 engaging below the retaining strip 62, so that the dosing cylinder 2 is axially secured. Its position in alignment with axis 12 is reached by its movement up to a stop bar 63 located on the side of the outlet connection 45 on the base plate 3. The dosing cylinder 2 is then fixed on the other side by means of a conventional snap closure 64. The pipe coupling 57 between the discharge line 56 and the outlet connection 45 can then be closed. Dismantling takes place in the reverse order.

For the rotary drive of the cone plugs 36 and 43 between two end positions displaced by 180° relative to one another, a commercially available hydraulic rotary drive 65 is used and its driven shaft 66 is connected by means of a plug-in coupling 67 to the driver 39 of the dosing cylinder 1. The driver 39 and driven shaft 66 are constructed in complementary manner to one another.

By means of a chain or belt drive 68, an intermediate shaft 69 is coupled to the driven shaft 66 and is driven by the latter in the same rotation direction and with the same rotation angle of 180°. This intermediate shaft 69 is arranged in aligned manner with the axis 12 and engages by means of a plug-in coupling 70 in the driver 49 of the cone plug 43. The plug-in coupling 70 is constructed in such a way that the connection is made or broken in one of the two end positions of the cone plug 43 by the displacement of the dosing cylinder 2 in the represented manner.

On the bottom of the base plate 3 is provided a bearing flange 71, in which are mounted the driven shaft 66 and the intermediate shaft 69, in each case by means of ball bearings 72. The hydraulic rotary drive 65 is also fitted to said bearing flange 71.

The frame 4 can be suspended, but can also be supported relative to the floor or ground by means of a base frame 73.

As a result of the absolute parallel displacement of the cross-beam 9, the dosing piston 17 on the one hand and the plunger 22 on the other hand are always driven with an absolutely identical stroke. The ratio of the main mass on the one hand and the additive on the other hand conveyed on the one hand by the dosing cylinder 1 and on the other hand by the dosing cylinder 2 during one stroke is consequently only dependent on the relationship of the cross-section F17 of the dosing piston 7 to the cross-section F22 of the plunger 22 bringing about the feed action. In order to modify this volume ratio, it is consequently only necessary to interchange the plunger 22 with the guide bush 24 with a plunger with a different diameter. As the cross-section F2 of the dosing cylinder 2 is always significantly larger than the cross-section F22 of the plunger 22, the cross-sectional ratio being e.g. 4 to 10, the volume ratio of the main material and additive can be varied within very wide limits.

As the filling of the dosing cylinders 1, 2 with a corresponding positioning of the cone plugs 36, 43 takes place by means of pumps under pressure, only the dosed removal of the main material and additive takes place by means of the dosing piston 17 or plunger 22 using the hydraulic working cylinder 7.

There is in fact a purely volume dosing in the above-described dosing device. However, since as a rule incompressible or substantially incompressible main materials and additives are dosed, there is simultaneously also dosing in a fixed given quantity ratio.

The invention is not restricted to the above-described embodiment but variations and modifications may be made without departing from the spirit and scope of the invention as defined by the appended claims.

I claim:

1. A dosing device for dosing viscous materials, particularly highly viscous materials, including a dosing cylinder for a main material and at least one dosing cylinder for an additive to be dosed in an in each case fixed but variable volume ratio with respect to the main material, with a pressure feeding of the main material and additive into the dosing cylinders, each dosing cylinder containing a drivable dosing piston, a common drive and said dosing pistons being arranged on a common frame, a respective supply connection issuing into each dosing cylinder and a respective outlet connection issuing therefrom, each of said connections being openable or closable by means of a respective two-way valve, said dosing cylinders being arranged substantially parallel to one another, the dosing pistons of said dosing cylinders being drivable with an identical stroke and the dosing piston of the at least one additive dosing cylinder being contructed as a plunger with a smaller cross-section than the cross-section of the dosing cylinder for said main material and the plunger being sealingly guided in an interchangeable guide bush of said additive dosing cylinder, said at least one additive dosing cylinder being connected as a sub-assembly in an interchangeable manner by means of a rapidly connectable and releasable coupling to said frame, the dosing piston of the cylinder for said main material and the plunger of said at least one additive dosing cylinder engaging with a cross-beam which is displaceable by said drive parallel to itself along the axes of said dosing piston and plunger, the plunger of said at least one additive dosing cylinder not being connected to said cross-beam, the two-way valve being a cone-plug forming one unit with said additive dosing cylinder, said cone-plug of the at least one additive dosing cylinder being connected by means of a detachable coupling to a rotary drive.

2. A dosing device as claimed in claim 1, in which each said two-way valve is constructed as a cone plug which is sealed against the inner wall of the associated dosing cylinder on the side of said supply connection and outlet connection remote from the dosing piston.

3. A dosing device as claimed in claim 2, in which each said cone plug is supported on a respective sliding disk.

4. A dosing device is claimed in claim 1, in which the rapidly connectable and releasable coupling includes a sliding connection enabling the additive dosing cylinder to be displaced parallel to its axis.

* * * * *